United States Patent [19]

Nakamura

[11] 4,041,909
[45] Aug. 16, 1977

[54] INTERNAL-COMBUSTION ENGINE HAVING A SUB-COMBUSTION CHAMBER

[75] Inventor: Norihiko Nakamura, Mishima, Japan

[73] Assignee: Toyota Jidosha Kogyo Kabushiki Kaisha, Toyota, Japan

[21] Appl. No.: 532,224

[22] Filed: Dec. 12, 1974

[30] Foreign Application Priority Data

Sept. 24, 1974  Japan ............................. 49-115501[U]

[51] Int. Cl.² .............................................. F02B 23/00
[52] U.S. Cl. ............................ 123/32 SP; 123/32 AA; 123/191 S; 123/191 SP
[58] Field of Search .................. 123/32 A, 32 B, 32 C, 123/32 D, 32 SP, 32 ST, 32 AA, 32 JT, 32 J, 191 S, 191 SP

[56] References Cited

U.S. PATENT DOCUMENTS

| 2,638,081 | 5/1953 | Spannhake | 123/32 |
|---|---|---|---|
| 2,690,742 | 10/1954 | Keupfer | 123/32 |
| 2,779,319 | 1/1957 | Göschel | 123/32 SP |
| 2,966,146 | 12/1960 | Schweitzer et al. | 123/32 B |
| 3,456,627 | 7/1969 | Spiers et al. | 123/32 A |
| 3,730,163 | 5/1973 | Elsbett et al. | 123/32 B |
| 3,776,212 | 12/1973 | Karlowitz | 123/32 SP |
| 3,844,259 | 10/1974 | Asaka | 123/32 SP |
| 3,890,940 | 6/1975 | List | 123/191 S |
| 3,921,605 | 11/1975 | Wyczalek | 123/191 S |
| 3,926,158 | 12/1975 | Dolza | 123/32 ST |

FOREIGN PATENT DOCUMENTS 876,598  9/1961  United Kingdom ................... 123/32

Primary Examiner—Carroll B. Dority, Jr.
Assistant Examiner—Paul Devinsky
Attorney, Agent, or Firm—Cushman, Darby & Cushman

[57] ABSTRACT

An internal-combustion engine having a combustion chamber consisting of a main combustion chamber and a sub-combustion chamber, said main combustion chamber being defined by the inner surface of the cylinder head and the top surface of the piston in the cylinder, said sub-combustion chamber being formed in a sub-chamber element, said sub-chamber element being forcedly fitted into a recess arranged in said cylinder head, and the coefficient of thermal expansion of said cylinder head being 1.5 to 2.5 times that of said sub-chamber element.

3 Claims, 1 Drawing Figure

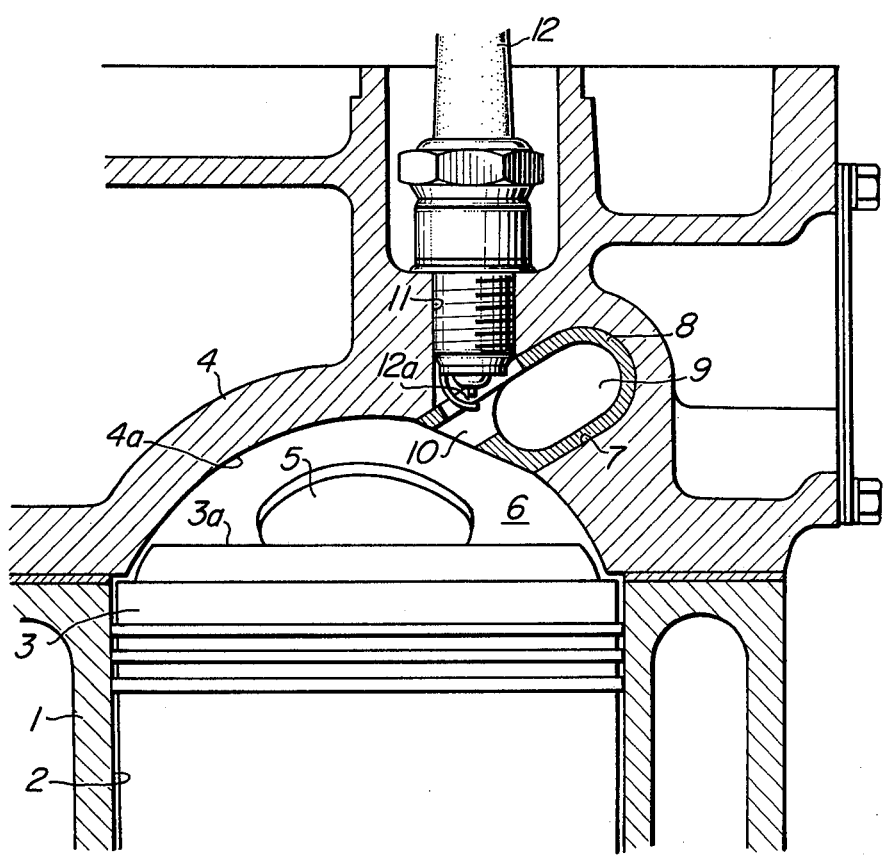

INTERNAL-COMBUSTION ENGINE HAVING A SUB-COMBUSTION CHAMBER

BACKGROUND OF THE INVENTION

1. Field of The Invention

The present invention relates to an improvement in the internal-combustion engine which has combustion chamber consisting of a main combustion chamber and a sub-combustion chamber to burn lean air-fuel mixture.

2. Description of the Prior Art

Heretofore, there has been publicly known a method such that air-fuel mixture with high air-fuel ratio is supplied to an internal-combustion engine (hereinafter sometimes referred to merely as "engine") to take place the combustion of lean air-fuel mixture in the engine, in order to decrease effectively and simultaneously the contents of CO (carbon monoxide), HC (unburnt hydrocarbons), and NOx (nitrogen oxides) which are harmful components contained in the exhaust gas of internal-combustion engine. However, such a lean air-fuel mixture has an inferior ignitability and a low speed of combustion, resulting in a degraded engine efficiency and an unfavorable rate of fuel consumption (g/horsepower · time).

An internal-combustion engine having a main combustion chamber and a sub-combustion chamber is publicly known, which is designed for eliminating the disadvantage described above. In this engine with sub-combustion chamber, the combustion chamber is divided into a main combustion chamber and a sub-combustion chamber in communication with the main combustion chamber through a passage. The air-fuel mixture formed in the sub-combustion chamber is initially ignited by a sparking plug. On account of the pressure rise due to the combustion of the air-fuel mixture in the sub-combustion chamber, the combustion gas in the sub-combustion chamber is discharged at a high velocity and over a large area through said passage into the main combustion chamber so that the air-fuel mixture in the main combustion chamber burns very rapidly, and thus the speed of combustion of the air-fuel mixture in the main combustion chamber is increased and the engine efficiency is prevented from being degraded.

The internal-combustion engine having a sub-combustion chamber is classified into two types, i.e., the stratified combustion type and the homogenious lean mixture combustion type. The stratified combustion type of internal-combustion engine, uses an auxiliary intake valve or the like for introducing a readily ignitable rich air-fuel mixture into the sub-combustion chamber so that the rich air-fuel mixture is initially ignited and burns. Some automobile manufacturers are producing this type of internal-combustion engine on a commercial basis, and a fairly large number of the engine is being marketed. This type of internal-combustion engine having a sub-combustion chamber is capable of performing a very sure igniting operation and can run satisfactorily even when the main combustion chamber is filled with an extremely lean air-fuel mixture. However, since two kinds of air-fuel mixtures with different air-fuel ratios must be supplied to the engine, the fuel supply system and the valve mechanisms become much complicated, resulting in such disadvantages as that difficult problems arise in the manufacture of the engine which naturally leads to increased production costs, that the control and adjustment of fuel supply system are rendered very difficult, and that the inspection, repair, and maintenance of the engine require respectively a large number of steps.

On the other hand, in the homogenious lean mixture combustion type of internal combustion engine, the sub-combustion chamber has no means for the introduction of air-fuel mixture such as an auxiliary intake valve and the like, and during the compression strokeof the engine the air-fuel mixture in the main combustion chamber is forced into the sub-combustion chamber through previously described passage to be ignited and burned in the sub-combustion chamber. This type of engine has a very simple construction, and enjoys a high reliability and the ease of manufacture and maintenance. However, to date the actual use of this type of engine has been considered to be nearly impossible for the reason that the ignition is extremely difficult because the lean air-fuel mixture, which in itself is inferior in the ignitability, is adversely affected to a great degree in terms of the ignitability by the burned residual gas existing in the sub-combustion chamber, which were produced by the previous combustion. The applicant of the present invention proposed an internal-combustion engine in which the spark gap of the sparking plug is located in the previously described passage for the purpose of solving the problem described above. In this type of internal-combustion engine, at the moment of ignition just before the end of the compression stroke, the burned residual gas produced by the previous combustion which had been existing in the passage have been carried away into the sub-combustion chamber by the flow of air-fuel mixture existing in the passage during the compression stroke, so that the adverse effects of residual gas on the ignitability can be avoided and the ignition of a lean air-fuel mixture can be performed in a satisfactory manner merely by using a well known high performance ignition system.

In case of the internal-combustion engine having a sub-combustion chamber described above, the interior of the sub-combustion chamber, particularly the passage and its neighorhood, tends to reach a high temperature because the combustion takes place first in the sub-combustion chamber. The homogeneous lean mixture combustion type of internal-combustion engine has a pronounced tendency to such a phenomenon since the lean air-fuel mixture does not have a cooling effect on the interior of the sub-combustion chamber. For this reason, there arises a necessity to construct the sub-combustion chamber with a highly heat resisting material such as stainless steel and the like. However, from the standpoint of production costs and machining operations the cylinder head undergoes, it is impossible to construct the whole body of the cylinder head of an engine with stainless steel. Therefore, there is a need of constructing the sub-combustion chamber with a material different from the material of which the cylinder head is made.

In order to offer a solution to this problem, the applicants of the present invention proposed an internal-combustion engine having a sub-combustion chamber in which a sub-combustion chamber is formed in a sub-chamber element separate from the cylinder head, and said sub-chamber element is forcedly fitted into a recess provided in the cylinder head so that a combustion chamber consisting of a main combustion chamber and a sub-combustion chamber is formed. In this engine, instead of using threaded fasteners and the like, the force fit which enables to obtain a thermal resistance lower than those obtained by the other methods is employed to fix the sub-chamber element in the cylinder head, with the result that the heat dissipates from the sub-combustion chamber in a satisfactory manner, and the troubles such as pre-ignition and the like due to the overheating of sub-combustion chamber is effectively prevented from ocurring.

However, when the sub-chamber element is fixed in the cylinder head by means of the force fit, there arises the following problem. During the operation of the engine, the sub-chamber element is heated to a very high temperature, while the temperature of the cylinder head is kept within a certain limited range because the cylinder head is cooled by the cooling water or the like. As a result, a very large stress is produced in the portion of the cylinder head where the sub-chamber element is forcedly fitted due to the difference in thermal expansion between the sub-chamber element and the cylinder head. This stress results in a creep failure and a decreased holding power of the portion of the cylinder head where the sub-chamber element is forcedly fitted. With the increase in thermal resistance, the sub-chamber element is overheated and melts. In some extreme cases, after the engine has cooled the sub-chamber element drops into the main combustion chamber damaging the whole engine. Needless to say, this constitutes a serious disadvantage.

SUMMARY OF THE INVENTION

The object of the present invention is to provide an internal-combustion engine which can eliminate the disadvantage described above.

In accordance with the present invention, the above object has been attained by an internal-combustion engine having a combustion chamber consisting of a main combustion chamber and a sub-combustion chamber, said main combustion chamber being defined by the inner surface of the cylinder head and the top surface of the piston in the cylinder, said sub-combustion chamber being formed in a sub-chamber element, said sub-chamber element being forcedly fitted into a recess arranged in said cylinder head, in which the coefficient of thermal expansion of said cylinder head is 1.5 to 2.5 times that of said sub-chamber element.

BRIEF DESCRIPTION OF THE DRAWING

The single FIGURE is a schematic sectional view showing an internal-combustion engine having a sub-combustion chamber.

DETAILED DESCRIPTION OF PREFERRED EMBODIMENT

Hereunder a full explanation will be given to the present invention with reference to an embodiment thereof illustrated in the drawing. Referring to the figure, a cylinder block 1 has formed therein a cylinder 2 into which a piston 3 is inserted such that the piston 3 can reciprocate. A cylinder head 4 is attached onto the cylinder block 1 using a suitable fastening means. In this embodiment, the cylinder head 4 is made of an aluminum alloy having a coefficient of thermal expansion of approximately $24 \times 10^{-6}/°C$. A main combustion chamber 6 is defined by the top surface 3a of the piston 3 positioned at the upper dead center at the end of the compression stroke and the inner surface 4a of the cylinder head 4. The main combustion chamber 6 is provided with an intake valve 5 for admitting the air-fuel mixture and an exhaust valve (not shown). A recess 7 is disposed in the vicinity of the top of the main combustion chamber 6. A sub-chamber element 8 is forcedly fitted into the recess 7. In the sub-chamber element 8 there are formed a sub-combustion chamber 9 and a passage 10 leading from the sub-combustion chamber 9 to the main combustion chamber 6. In this embodiment, the sub-chamber element 8 is made of a stainless steel having a coefficient of thermal expansion of approximately $13 \times 10^{-6}/°C$. A hole 11 extends through the sub-chamber element 8 and the cylinder head 4 establishing a communication between the passage 10 and the outside of the cylinder head 4. A sparking plug 12 is screwed into the hole 11. The spark gap 12a of the sparking plug 12 is located in the passage 10.

As described previously, during the operation of engine, the sub-chamber element 8 reached a high temperature and undergoes a thermal expansion. The cylinder head 4 acquires a temperature which is fairly high but far below the temperature of the sub-chamber element 8, and also undergoes a thermal expansion. Since the co-efficient of thermal expansion of the cylinder head 4 is larger than that of the sub-chamber element 8 as described previously, the cylinder head 4 and the sub-chamber element 8 undergo thermal expansions to nearly the same extent although they reach different temperatures. Due to this phenomenon, an excessively large stress is prevented from being produced in the portion of the cylinder head where the sub-chamber element is forcedly fitted, so that the possibility of creep failure is eliminated, the overheating of and damage to the sub-chamber element is avoided, and the sub-chamber element can be held in place properly without dropping into the main combustion chamber.

Experiments have shown that for a regular automobile internal-combustion engine with a stroke volume of 250 to 600 c.c. the best result is obtained when the coefficient of thermal expansion of the cylinder head is about twice that of the sub-chamber element. In case the sub-chamber element is made of stainless steel, the above relationship between the two coefficients of thermal expansion is attained if the cylinder head is constructed of an aluminum alloy.

In the embodiment illustrated in the figure, the sub-chamber element 8 has an outer diameter of 20 mm. According to the experimental results, during a high speed operation of engine, the sub-chamber element and the cylinder head respectively reach temperatures of about 300° C and about 140° C.

Therefore, the amount of thermal expansion $\Delta l_1$ of the sub-chamber element 8 is found by the following equation:

$$\Delta l_1 = 20 \text{ mm.} \times 13 \times 10^{-6}/°C \times 300° C \approx 7.8 \times 10^{-2} \text{ mm.}$$

The amount of thermal expansion $\Delta l_2$ of the recess 7 in the cylinder head made of an aluminum alloy is computed as follows:

$$\Delta l_2 = 20 \text{ mm. } 33 \; 24 \times 10^{-6}/°C \times 140° C \approx 6.7 \times 10^{-2} \text{ mm.}$$

Thus, the amount of the distortion due to thermal expansion of the recess in the cylinder head is found by the followng equation:

$$\Delta l_1 - \Delta l_2 = 7.8 \times 10^{-2} - 6.7 \times 10^{-2} = 1.1 \times 10^{-2} \text{ mm.}$$

On the other hand, in case the cylinder head is made of a cast iron which has a coefficient of thermal expansion of $13 \times 10^{-6}/°$ C, the amount of thermal expansion $\Delta l_3$ of the recess in the cylinder is $$\Delta l_3 = 20 \text{ mm.} \times 13 \times 10^{-6}/° \times 140° \text{ C} = 3.65 \times 10^{-2} \text{ mm.}$$

Thus, the amount of the distortion due to thermal expansion of the recess in the cylinder head is $$\Delta l_1 - \Delta l_3 = 7.8 \times 10^{-2} - 3.6 \times 10^{-2} = 4.2 \times 10^{-2} \text{ mm.}$$

As can be seen from the above, the amount of the distortion due to thermal expansion of a cylinder head made of cast iron is approximately four times that of a cylinder head made of aluminum. And owing to this large amount of distortion, the former cylinder head undergoes a creep failure.

An engine having a cast iron cylinder head into which the stainless steel sub-chamber element is fitted and an engine having an aluminum alloy cylinder head into which the stainless steel sub-chamber element is fitted were subjected to a bench test under an operating condition of full load × 5000 rpm. The former engine showed mechanical trouble one hour after the start of the test. In contrast to this, the latter engine showed no mechanical troubles even after 200 hours of the test operation.

As has been described in the foregoing, the internal-combustion engine in accordance with the present invention can, thanks to its unique construction that the coefficient of thermal expansion of the cylinder head is made larger than that of the sub-chamber element, effectively avoid creep failure with the result that the sub-chamber element is prevented from overheating, melting, and dropping into the main combustion chamber.

I claim:

1. An internal-combustion engine comprising a cylinder, a cylinder head having a recess opening to the inner surface thereof, a piston for sliding movement within said cylinder, a main combustion chamber being defined between the inner surface of said cylinder head and the top surface of said piston and having an intake valve for admitting the lean air-fuel mixture thereinto and an exhaust valve for discharging the exhaust gas therefrom, a sub-chamber element fitted into said recess of the cylinder head in overall close contact relation with and securely held in position under contact pressure against said recess and formed therein with a sub-chamber and a passage which intercommunicate said sub-chamber and said main combustion chamber for providing the only supply of air-fuel mixture for said sub-chamber in which the coefficient of thermal expansion of said cylinder head is 1.5 to 2.5 times that of said sub-chamber element, thereby preventing said sub-chamber element from dropping into said main combustion chamber, and a spark plug having a sparking gap for exposing said gap to said passage.

2. An internal-combustion engine in accordance with claim 1 in which said cylinder head is made of an aluminum alloy and said sub-chamber element is made of stainless steel.

3. An internal-combustion engine as claimed in claim 2, in which said aluminum alloy has a coefficient of thermal expansion of approximately $24 \times 10^{-6}/°$ C and said stainless steel has a coefficient of thermal expansion of approximately $13 \times 10^{-6}/°$ C.

* * * * *